Aug. 7, 1962 — H. T. RUTHERFORD — 3,048,237
MOTOR VEHICLE SUPPORT

Filed Oct. 14, 1959 — 3 Sheets-Sheet 1

INVENTOR
HARRY T. RUTHERFORD
BY
ATTORNEY

Aug. 7, 1962 H. T. RUTHERFORD 3,048,237
MOTOR VEHICLE SUPPORT
Filed Oct. 14, 1959 3 Sheets-Sheet 2
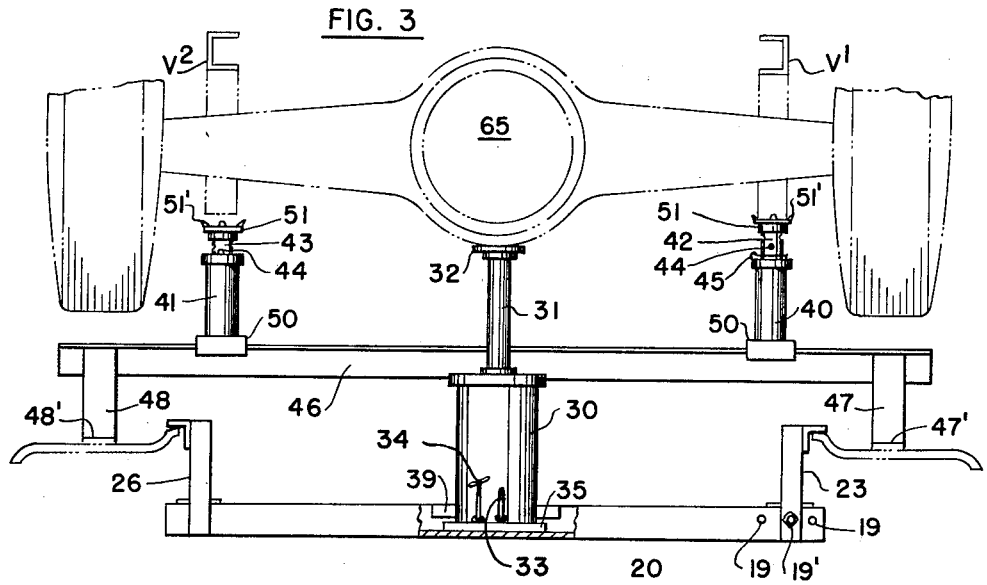
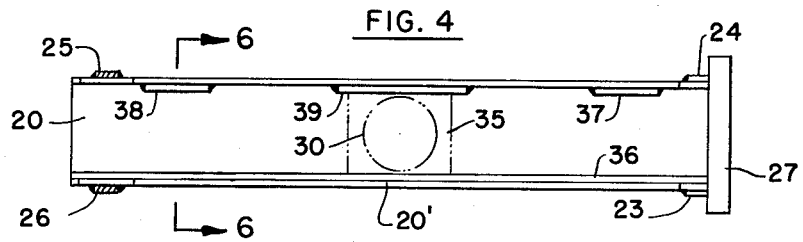
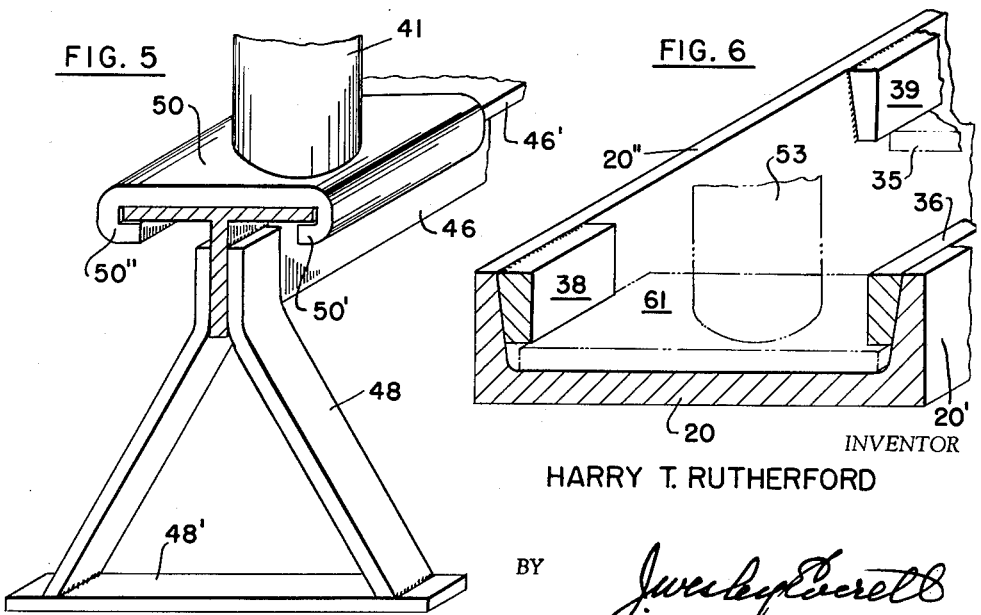
INVENTOR
HARRY T. RUTHERFORD
BY
ATTORNEY Aug. 7, 1962 H. T. RUTHERFORD 3,048,237
MOTOR VEHICLE SUPPORT
Filed Oct. 14, 1959 3 Sheets-Sheet 3

INVENTOR
HARRY T. RUTHERFORD

BY *Wesley Everett*

ATTORNEY

– – –

United States Patent Office 3,048,237
Patented Aug. 7, 1962

3,048,237
MOTOR VEHICLE SUPPORT
Harry T. Rutherford, Baltimore, Md., assignor to
Nathan J. Blaker, Baltimore, Md.
Filed Oct. 14, 1959, Ser. No. 846,311
1 Claim. (Cl. 187—8.43)

The present invention relates to a device for raising and supporting a motor vehicle from off a conventional drive-on lift. The type of lift with which we are here concerned is provided with tracks, or treads on which the wheels of the vehicle are supported in order that the vehicle may be elevated in order that a workman may work beneath the vehicle in an upright position. While a conventional lift may be quite satisfactory for working on many parts of the vehicle, there are times when the wheels, or the wheel brakes of the vehicle also must be serviced, or a tire changed which requires the wheel to be free from the track. When this occurs the wheel must be lifted from the track and it is upon this general idea that the present device has been developed.

The primary object of the invention is to provide a device that may be used in conjunction with a conventional drive-on vehicle lift that will support the vehicle on the lift independently of the vehicles wheels.

Another object of the invention is to provide novel means for accomplishing this result without changing any part of the lift itself.

A further object of the invention is to provide such a device that will not require any additional power equipment other than is normally found about an establishment using such a lift.

Still a further object of the invention is to provide such a device that will be safe and simple to operate.

While several objects of the invention have been pointed out other objects uses and advantages will be apparent as the nature of its invention becomes more fully disclosed which consists of its novel construction, arrangement and combination of its several parts as illustrated in the accompanying drawings and described in the specifications to follow.

In the drawings:

FIGURE 3 is an elevational view of the device operating under the rear of the vehicle.

FIGURE 4 is a plan view of one of the members of the device.

FIGURE 5 is an enlarged perspective view partly in sections showing the arrangement of one of the supporting elements illustrated in FIGURE 3.

FIGURE 6 is an enlarged perspective view partly in sections showing the arrangement of one of the elements illustrated in FIG. 2.

In describing the invention like numerals are used to point out like and similar parts throughout the several views.

The device is adapted to be used with what is known as a drive-on lift. The lift may take the form of a hydraulically operated post 18 and a pair of parallel track members 21 and 22. However, there are other types of lifts having drive-on tracks that are mechanically operated and with which the present device functions equally as well.

The present device is for raising the weight of vehicles from off the wheels for the purpose of servicing the wheels, brake devices, exchanging tires, etc.

Figure 9:
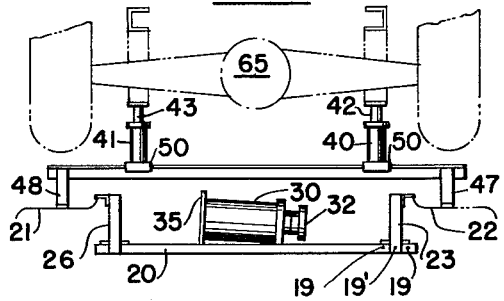
Figure 13:
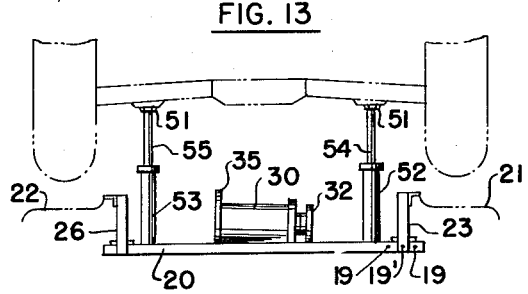

The device comprises a jack supporting member of channel form having a bottom portion 20 and two side portions 20' and 20" extending laterally between and supported on the inner edges of the two track members 21 and 22. The jack supporting member as mentioned before is preferably of a channel design, as shown in FIGURE 6. At the ends of the jack supporting member are hanger members 23, 24, 25, and 26 having one end of each hanger member secured to the sides 20' and 20" of the jack support. To the upper ends of the hangers there is fixed angled strip members 27 and 28 in which one portion of the angled strip extends over the inner edge of the track members 21 and 22 to support the jack supporting member. Cooperating with the jack support is a fluid operated jack having a stationary cylinder 30 and a movable piston rod 31 having one end connected with a piston head within the cylinder 30 (not shown) and its outer end connected with a head member 32. The jack is operated upwardly by attaching an air hose to a valved intake member 33, and when it is desired to retract the jack, an escape valve 34 is operated to release the fluid pressure within the cylinder allowing the weight of the vehicle to force the piston rod and piston down. The jack is carried on a base 35 of square or rectangular form which is of such dimensions in one direction as to be freely slidable on the upper surface of portion 20 within the jack support. The jack support is provided with means in certain areas to retain the jack in an upright position. These areas are adjacent the center and at each end of the support member and consist of a continuous strip 36 extending along and on the inner upper edge of the side portion 20' of the jack support and on the inner upper edge of the side portion 20". The strip along the side 20" is in three sections designated as 37 and 38 adjacent the ends of the jack support and 39 adjacent the center thereof. These strips are positioned upwardly from the upper surface of the portion 20 for a distance to allow the edge of the jack base 35 to move freely between the strip and the upper surface 20 of the jack support. The edges of the base move beneath the lower edges of the strip member 36 to 39 and the portion 20 of the jack support hold the jack in an upright position. The space between the strips 37 and 39 and 38 and 39 are for removing the jack from the jack support, or for positioning the jack in a horizontal position as shown in FIGURES 9 and 13.

The vehicle is raised one end at a time from and supported above the tracks of the lift. Starting with the rear of the vehicle the jack base 35 is inserted beneath the strips 36 and 39 adjacent the center of the vehicle and fluid pressure is inserted into the cylinder 30 through the inlet 33 and the vehicle is raised to a predetermined height. For supporting the vehicle at the proper height there is provided movably adjustable stands having a lower outer portion 40 and 41 and an inner telescoping portion 42 and 43. These inner portions 42 and 43 are provided with a plurality of apertures 44 and are manually adjustable as to height and retained at the desired height by inserting pins 45 through the aperture to rest on the upper edges of the outer portion. The stands are carried and supported upon a cross-bar 46 which is of T form in cross section, the top portion 46' of the T member being in a horizontal plane. The cross-bar is provided with a horse-like support at 47 and 48 at each end of the cross-bar. The bottom plates 47' and 48' are adapted to each rest on the upper surfaces of the parallel track members 21 and 22, as shown in FIGURE 3. Each of the two stands designated by numbers from 40 to 43 are provided with a base that is adapted to slidably engage the upper portion 46' of the cross-bar 46. The outer edges 50' and 50" of the base are formed around the edges of the portion 46' of the cross-bar and engage the under sides thereof, as shown in FIG. 5. This allows the stands to be adjusted laterally of the vehicle and in position to engage the under frame of the vehicle and generally to engage the frame just in front of each of the rear wheels, whereby when the fluid jack is retracted the vehicle will be supported upon the stands by the frame of the vehicle, leaving the wheels out of contact with the tracks 21 and 22.

Figures 1, 2:
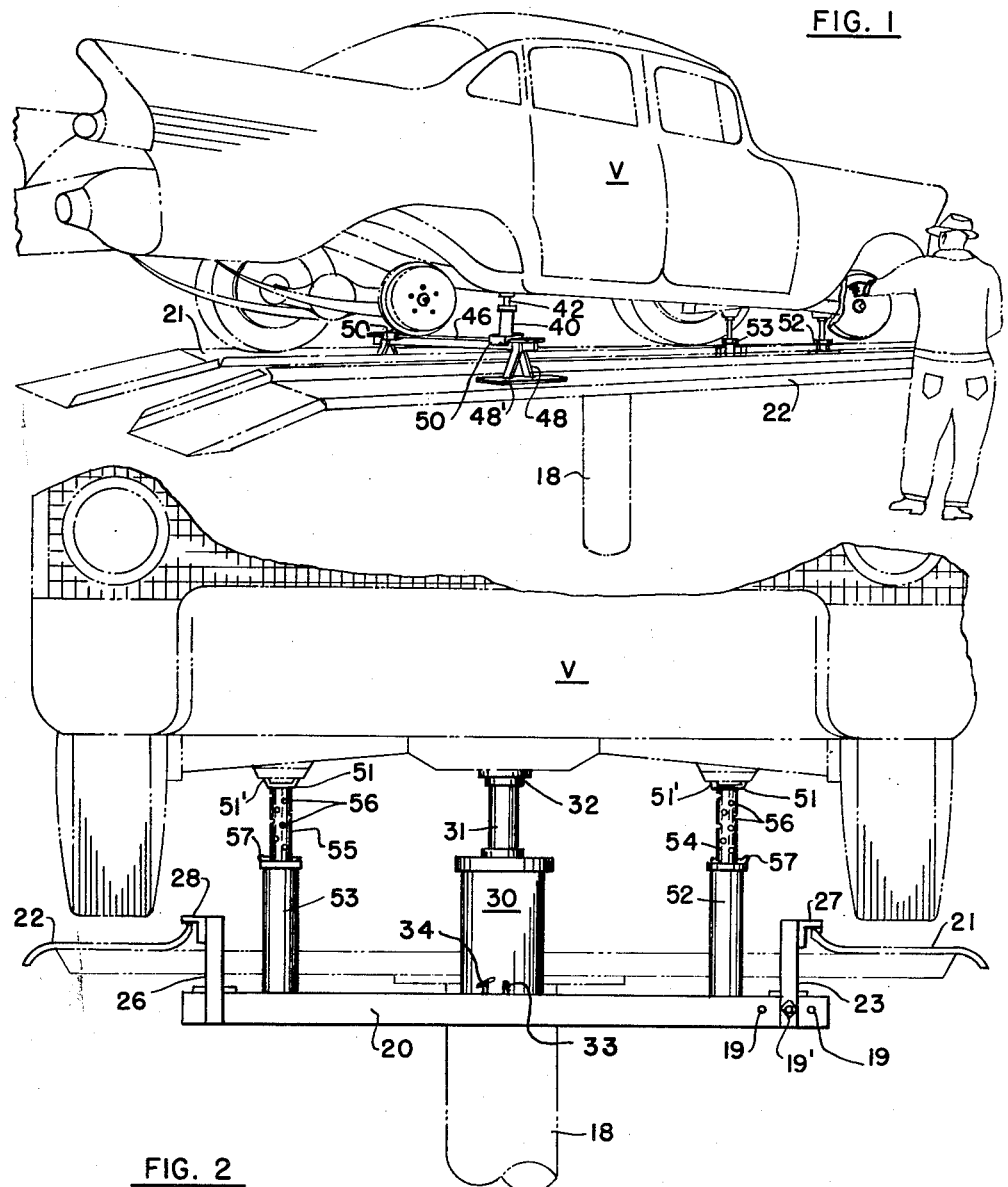
FIGURE 1 is a view in perspective showing a motor vehicle elevated upon a vehicle lift having two of the wheels removed showing the supports supporting the vehicle free of the wheels.
FIGURE 2 is an elevational view of the device when operating under the front of the vehicle.

Elevating the frame of the vehicle is very similar to that already described for the rear of the vehicle. The fluid jack support is positioned on the opposite end of the tracks and adjusted to a point where the jack can efficiently operate to raise the front end of the vehicle. The front end of the vehicle is raised by the fluid jack, as shown in FIG. 2 and outwardly from the fluid operated jack are movably adjusted stands. These stands are provided for supporting the vehicles at a point adjacent each of the front wheels. The front stands are very similar to the stands used to support the rear of the vehicle except, in over all appearance, they are longer, and comprise an outer member 52 and 53 and an inner telescoping inner member 54 and 55. These stands used at the front of the vehicle are provided with flat bases 60 and 61 similar to that provided for the fluid operated jack. The inner members 54 and 56 are provided with a plurality of apertures 56 which are adapted to receive pins 57 for adjusting their heights. When the fluid jack has raised the front end of the vehicle to a predetermined height, the two stands designated by numerals 52 to 54 are placed in position. The flat bases are supported on the upper surface of the fluid jack support having its edges positioned below the continuous strip 36 and one of the short strips 37, or 38 positioned at the ends of the fluid jack support. This retains the stands in an upright position and functions for the same purpose as the base 50 for the stands supporting the rear of the vehicle. When the fluid jack is retracted the stands support the front end of the vehicle by the frame and leave the wheels free of the tracks 21 and 22. The heads 51 of the stands are provided with sharp points at their corners for insuring engagement with the elements in which the head is in engagement.

With the use of the present device it will allow for tire changing, brake adjusting, replacement etc. to be carried on at a level that is most comfortable for the workman, which is also the position where work can be carried on more efficiently.

Figure 7:
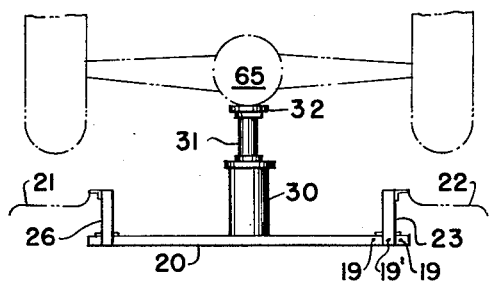
FIGURES 7, 8 and 9 are elevational views illustrating in sequence the steps used in elevating and supporting the rear of the vehicle from off the rear wheels.
Figure 8:
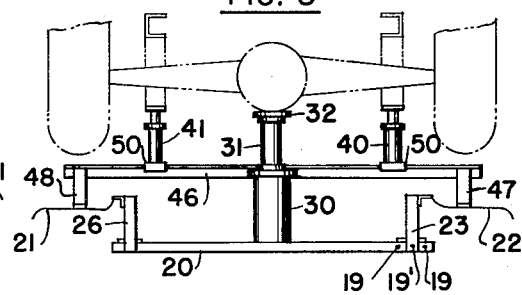

In brief, the use of the device is quite simple, first the vehicle V is positioned on the lift tracks 21 and 22. The fluid jack support 20 is adjusted so the hanger elements 27 and 28 will rest on the inner edges of the track members 21 and 22. It will be noted that the hanger elements 23 are adjustable to tracks of different spacings by means of the holes 19 and the bolts 19' in the jack support 20. If the rear of the vehicle is the first to be raised the fluid jack is placed on the jack support 20 and under the differential housing 65, pressure is applied to the jack and the vehicle raised. At the desired height the cross-bar 46 is placed in front of the rear wheels and manually adjusted as to height and to the proper location to contact the frame elements $V^1$ and $V^2$ when the fluid jack 30 is lowered. When the fluid jack piston rod 31 is retracted the frame elements $V^1$ and $V^2$ come to rest on the stands, after which the fluid jack is removed or turned in a horizontal position on the jack support and out of the way if work is being done in the vicinity of the differential, or rear end of the vehicle. The steps in raising the rear end of the vehicle is illustrated in FIGURES 7, 8 and 9. In FIGURE 7 the vehicle is shown after it has been raised by the fluid jack 30 showing the wheels being clear of the tracks 21 and 22. In FIG. 8 the cross-bar 46 is shown in place resting on the tracks 21 and 22 and the stands 40 and 41 are shown engaging the frame elements $V^1$ and $V^2$. In FIG. 9 the fluid jack has been completely removed and the stands are now carrying the full load of the vehicle.

Figure 10:
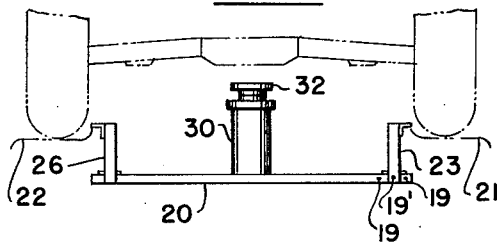
FIGURES 10, 11, 12 and 13 are elevational views illustrating in sequence the steps used in elevating and supporting the front of the vehicle from off the front wheels.
Figure 11:
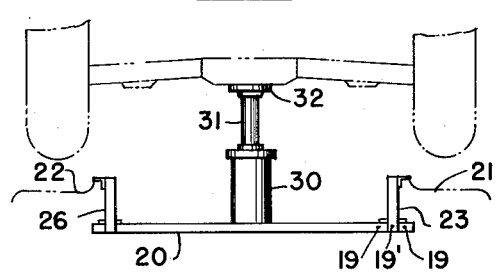
Figure 12:
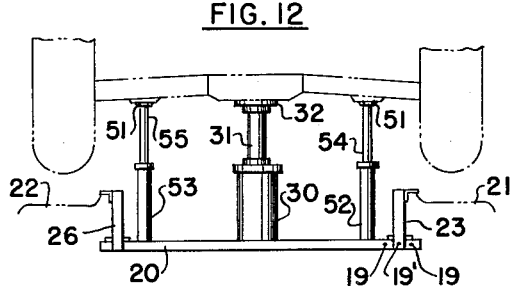

The use of the device is substantially the same for the front end of the vehicle and is particularly illustrated in FIGS. 10 to 13. In FIG. 10 the device is shown in position, that is, the fluid jack support 20 is in place and the fluid jack 30 is in position to raise the front end of the vehicle frame and front wheels. In FIG. 11 the fluid jack is shown extended lifting the front end of the vehicle until the wheels of the vehicle are clear of the tracks 21 and 22. In FIG. 12 the stand elements 52 to 54 are placed in position under the front wheel carrying members. In FIG. 13 the front end of the vehicle is shown supported on the stand elements 52 and 53, which are positioned one near each wheel. When the stands have been aligned and in proper position the fluid jack is retracted and may be moved to a horizontal position to give more room for servicing the wheels if need be, as shown in FIG. 13.

As stated before, the fluid jack is normally operated by air pressure, but it may be hydraulically operated or it may be operated by any other power means if desired.

Now that the invention has been described in detail and its use and application fully disclosed what is claimed as new and desired to be secured by Letters Patent is set forth in the appended claim.

I claim:

A vehicle support for use with a wheel vehicle lift equipped with a pair of elevatable tracks, a jack supporting member including a bottom and two side portions extending between and supported upon the inner edge of said tracks, a fluid operated jack including a rectangular base slidable along and resting upon the bottom of said jack supporting member adapted to engage the under-portion of the vehicle for lifting the same from the tracks, means carried by the two side portions of the jack support in the form of ribs adapted to extend over the opposite side edges of the slidable jack base for retaining the jack in the upright position at least at the center of the jack supporting member.

References Cited in the file of this patent

UNITED STATES PATENTS

| | | |
|---|---|---|
| 1,847,719 | Hirschel | Mar. 1, 1932 |
| 1,915,024 | Logette | June 20, 1933 |
| 2,037,531 | Moore | Apr. 14, 1936 |
| 2,080,481 | Hott | May 18, 1937 |
| 2,250,321 | Aron | July 22, 1941 |
| 2,612,355 | Thompson | Sept. 30, 1952 |

FOREIGN PATENTS

| | | |
|---|---|---|
| 496,877 | Italy | Aug. 11, 1954 |